(12) United States Patent
Tang et al.

(10) Patent No.: US 8,073,583 B2
(45) Date of Patent: Dec. 6, 2011

(54) APPARATUS AND METHOD FOR CONTROLLING ENERGY FEEDBACK FOR ELECTRIC VEHICLE

(75) Inventors: Xiaohua Tang, Shenzhen (CN); Xuguang Zhou, Shenzhen (CN); Ming Yu, Shenzhen (CN); Jian Gong, Shenzhen (CN); Nan Liu, Shenzhen (CN); Guangming Yang, Shenzhen (CN)

(73) Assignee: BYD Co. Ltd., Guangdong (CN)

( * ) Notice: Subject to any disclaimer, the term of this patent is extended or adjusted under 35 U.S.C. 154(b) by 280 days.

(21) Appl. No.: 12/521,038

(22) PCT Filed: Dec. 21, 2007

(86) PCT No.: PCT/CN2007/071296
§ 371 (c)(1),
(2), (4) Date: Nov. 10, 2009

(87) PCT Pub. No.: WO2008/077344
PCT Pub. Date: Jul. 3, 2008

(65) Prior Publication Data
US 2010/0138091 A1 Jun. 3, 2010

(30) Foreign Application Priority Data
Dec. 26, 2006 (CN) .......................... 2006 1 0157733

(51) Int. Cl.
*G05D 1/00* (2006.01)
(52) U.S. Cl. ......................................................... 701/22

(58) Field of Classification Search .................... 701/22, 701/36, 42, 48, 54, 60, 69, 70, 84, 115
See application file for complete search history.

(56) References Cited

U.S. PATENT DOCUMENTS

| 5,457,363 | A | * | 10/1995 | Yoshii et al. .................. 318/432 |
| 5,746,679 | A | * | 5/1998 | Minowa et al. ................. 477/92 |
| 6,691,013 | B1 | | 2/2004 | Brown |
| 2003/0191574 | A1 | | 10/2003 | Kawai et al. |
| 2005/0143878 | A1 | | 6/2005 | Park et al. |
| 2005/0264102 | A1 | | 12/2005 | Tezuka |

FOREIGN PATENT DOCUMENTS

JP 2005324640 11/2005

OTHER PUBLICATIONS

International Search Report dated Apr. 3, 2008 issued in PCT/CN2007/071296.

* cited by examiner

*Primary Examiner* — Kim T Nguyen
(74) *Attorney, Agent, or Firm* — Brinks Hofer Gilson & Lione

(57) ABSTRACT

An apparatus and method for controlling energy feedback for electric vehicles includes acquiring an accelerator-pedal travel value, a brake-pedal travel value and a current vehicle speed value, and determining whether the brake-pedal travel value is equal to 0%. Feedback torque based on the current vehicle speed value and the brake-pedal travel value with various conditions is then calculated. Mechanical energy generated by the feedback torque T is converted into electric energy and transmitted to battery of the electric vehicle for storing. Accordingly, the endurance mileage of electric vehicle may be effectively prolonged and the utilization efficiency of battery is improved.

11 Claims, 4 Drawing Sheets

US 8,073,583 B2

APPARATUS AND METHOD FOR CONTROLLING ENERGY FEEDBACK FOR ELECTRIC VEHICLE

CROSS-REFERENCE TO RELATED APPLICATIONS

This application is a national phase application of PCT Application No. PCT/CN2007/071296, filed Dec. 21, 2007, which claims priority from Chinese Patent Application No. 2006-10157733.1, filed Dec. 26, 2006, both contents of which are incorporated herein by reference in their entirety.

FIELD OF TECHNOLOGY

The present invention relates to energy feedback of electric vehicle, and in particular relates to an apparatus and method for controlling energy feedback for an electric vehicle.

BACKGROUND

During deceleration, the traditional fuel-fired vehicle adopts the mechanical brake. During the braking, the kinetic energy of vehicle is rapidly and greatly consumed by the mechanical friction such that realize the brake effect. This braking manner has the following disadvantages: if the vehicle brakes frequently or continuously, great amount of heat may be generated, and the brake may have the heat regression problem, which may give adverse influences to the brake effect; due to mechanical friction, the service life of brake shall be shortened, and the economy of vehicle shall be reduced. For an electric vehicle, its essential component is the battery, which is very important for the endurance mileage of electric vehicle. If it is decelerated with the brake of traditional fuel-fired vehicle, during braking, the energy is not fed back or absorbed, thereby the utilization rate of energy is very low, and a great amount of energy is wasted, the result is unfavorable for the endurance mileage of electric vehicle.

In prior arts, a regenerative brake energy feedback scheme to improve the endurance mileage of electric vehicle is provided. For example, Chinese patent applications No. CN1473724A and CN1647968A, etc., have mentioned the regenerative braking scheme, however, the structures of their systems are complex and the control methods are very complicated.

SUMMARY OF THE INVENTION

In order to solve the shortages of prior arts mentioned above, the present invention provides a reasonable apparatus and method for controlling energy feedback for electric vehicles, thus it may not only ensure the vehicle deceleration smoothness, but also effectively and reasonably realize the energy feedback, and improve the utilization rate of energy.

The present invention provides an apparatus for controlling energy feedback for an electric vehicle, comprising: an accelerator-pedal position sensor, for sensing position of the accelerator-pedal of the vehicle and sending an accelerator-pedal position signal to a motor controller; a brake-pedal position sensor, for sensing position of the brake-pedal of the vehicle and sending a brake-pedal position signal to the motor controller; a vehicle speed sensor, for sensing current speed of the vehicle and sending a current vehicle speed signal to the motor controller; the motor controller, configured to: receive the accelerator-pedal position signal, the brake-pedal position signal and the current vehicle speed signal, obtain an accelerator-pedal travel value Gain, a brake-pedal travel value Brake_Deep and a current vehicle speed value V based on said signals, and determine whether the brake-pedal travel value Brake_Deep is equal to 0%: if the brake-pedal travel value Brake_Deep is not equal to 0%, then calculate a feedback torque T based on the current vehicle speed value V and the brake-pedal travel value Brake_Deep, and control the motor of the electric vehicle to output the feedback torque T; or if the brake-pedal travel value Brake_Deep is equal to 0%, then comparing the accelerator-pedal travel value Gain with a given feedback value, and if the accelerator-pedal travel value Gain is not greater than the given feedback value, then calculate the feedback torque T based on the current vehicle speed value V and control the motor of the electric vehicle to output the feedback torque T; or if the accelerator-pedal travel value Gain is greater than the given feedback value, then set the feedback torque as 0; and an inverter, connected between the motor and the battery of the electric vehicle, the inverter is for converting mechanical energy generated by the feedback torque T into electric energy, and transmitting the electric energy to the battery for storing.

Moreover, the present invention provides a method for controlling energy feedback for an electric vehicle, comprising the following steps:

S1) acquiring an accelerator-pedal travel value Gain, a brake-pedal travel value Brake_Deep and a current vehicle speed value V;

S2) determining whether the brake-pedal travel value Brake_Deep is equal to 0%, and going to step S3 if the brake-pedal travel value Brake_Deep is not equal to 0%, or going to step S4 if the brake-pedal travel value Brake_Deep is equal to 0%;

S3) calculating a feedback torque T based on the current vehicle speed value V and the brake-pedal travel value Brake_Deep, and controlling the motor of the electric vehicle to output the feedback torque T;

S4) comparing the accelerator-pedal travel value Gain with a given feedback value, and then going to step S5 if the accelerator-pedal travel value Gain is not greater than the given feedback value, or going to step S6 if the accelerator-pedal travel value Gain is greater than the given feedback value;

S5) calculating the feedback torque T based on the current vehicle speed value V, and controlling the motor of the electric vehicle to output the feedback torque T;

S6) setting the feedback torque T as 0; and

S7) converting mechanical energy generated by the feedback torque T in steps S3 or S5 into electric energy, and transmitting the electric energy to battery of the electric vehicle for storing.

During energy feedback, allowing for the accelerator-pedal travel value and brake-pedal travel value, and combining with the current vehicle speed, the reasonable energy feedback may be realized under the guarantee of brake and deceleration efficiency and smoothness.

DETAILED DESCRIPTION OF THE PREFERRED EMBODIMENTS

The description combined with the attached figures is detailed as below.

Figure 1:
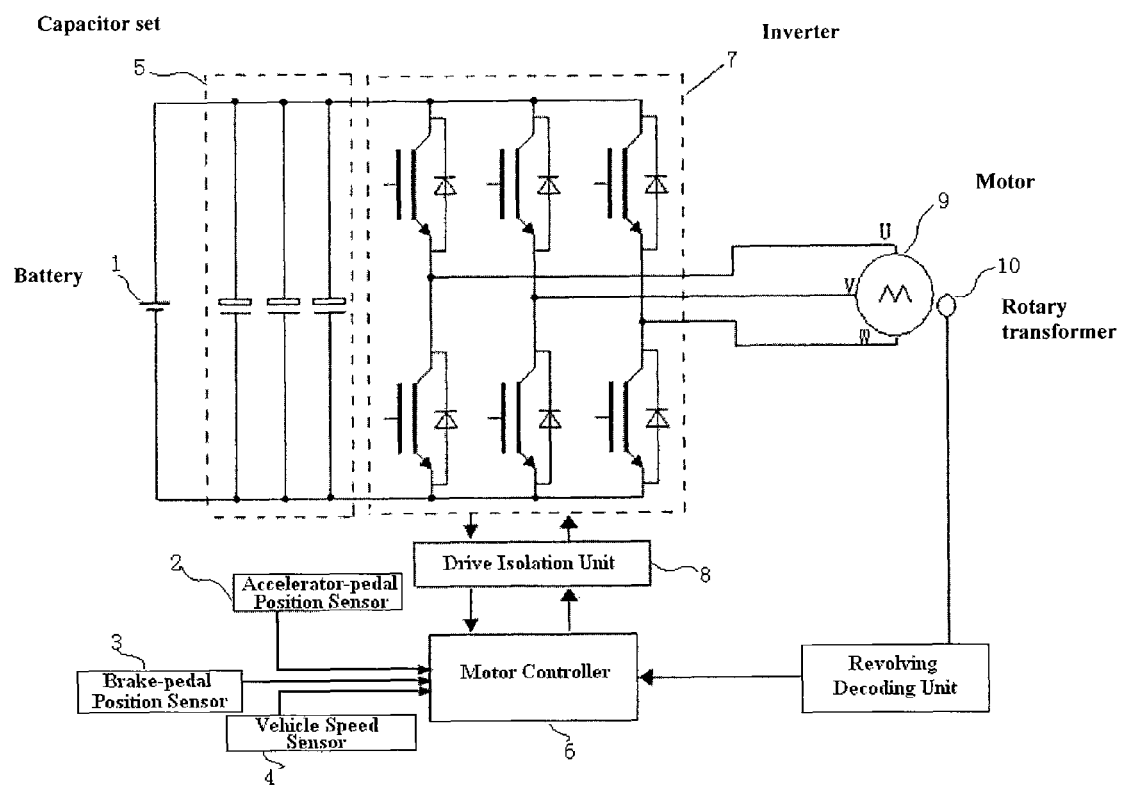
FIG. 1 is a simple structural view of the apparatus for controlling energy feedback for the electric vehicle according to the present invention.

FIG. 1 is a simple structural view of the apparatus for controlling energy feedback for the electric vehicle according to the present invention. Shown as FIG. 1, the apparatus provided by the present invention comprises: an accelerator-pedal position sensor 2, for sensing position of the accelerator-pedal of the vehicle and sending an accelerator-pedal position signal to a motor controller 6; a brake pedal position sensor 3, for sensing position of the brake-pedal of the vehicle and sending a brake-pedal position signal to the motor controller 6; a vehicle speed sensor 4, for sensing current speed of the vehicle and sending a current vehicle speed signal to the motor controller 6; the motor controller 6, for receiving the accelerator-pedal position signal, the brake-pedal position signal and the current vehicle speed signal, obtaining an accelerator-pedal travel value Gain, a brake-pedal travel value Brake_Deep and a current vehicle speed value V based on these signals, and determining a feedback torque T (the motor controller will be introduced in details later); and an inverter 7, connected between the motor 9 and the battery 1 of the electric vehicle, for converting mechanical energy generated by the feedback torque T into electric energy, and transmitting the electric energy to the battery 1 for storing.

Wherein, the battery 1 adopts the high power battery, 200V~330V, which is the energy supply of the whole electrical drive system. The accelerator-pedal position sensor 2 and the brake-pedal position sensor 3 shall be responsible for sensing the positions of the accelerator-pedal and the brake-pedal and sending the accelerator-pedal position signal and the brake-pedal position signal to the motor controller 6 respectively. The two sensors can be any type of position sensors. The motor controller 6 is used for calculating PWM signals for controlling the rotation of the motor, and sending PWM signals to the inverter 7. The inverter 7 comprises three intelligent power modules (IPM), which may be also realized with power devices such as IGBT or transistor etc, each IPM has a upper bridge arm and a lower bridge arm, the input terminals of three IPM upper bridge arms are connected with the positive bus of battery 1, and all the lower bridge arms are connected with the negative bus of the battery 1, all contacting nodes between the upper bridge arms and corresponding lower bridge arms are respectively connected with 3-phase coils of motor 9 (i.e. U-phase, V-phase, and W-phase). The motor 9 is a permanent-magnet synchronous motor, as the power output source of the electric vehicle.

It is preferred that the apparatus further comprises a drive isolation unit 8, the motor controller 6 is connected with the inverter 7 through the drive isolation unit 8, the drive isolating unit 8 is used for shielding the interference of noise from the side of inverter 7 to the motor controller 6.

Optionally, the vehicle speed sensor 4 may implemented by an individual speed sensor or by a rotary transformer 10 and a revolving decoding unit 11. The rotary transformer 10 is connected with the motor controller 6 through the revolving decoding unit 11. The rotary transformer 10 is for detecting the rotating angle position of the rotor of the motor 9, and sending the detected angle position signals to the revolving decoding unit 11, and the revolving decoding unit 11 is for decoding angle position values based on the angle position signals and sending the values to the motor controller 6 so that the motor controller 6 may calculate the current vehicle speed V according to the current angle position value and the previous angle position value.

Between the inverter 7 and the battery 1, there is a capacitor set 5 parallel-connected, i.e. the positive ends of the capacitor set 5 are connected with the positive bus of the battery 1 and the negative ends thereof are connected with the negative bus of the battery 1, the capacitor set 5 is used for absorbing the high frequency impact voltages and smoothing the DC voltage waveform.

Figure 2:
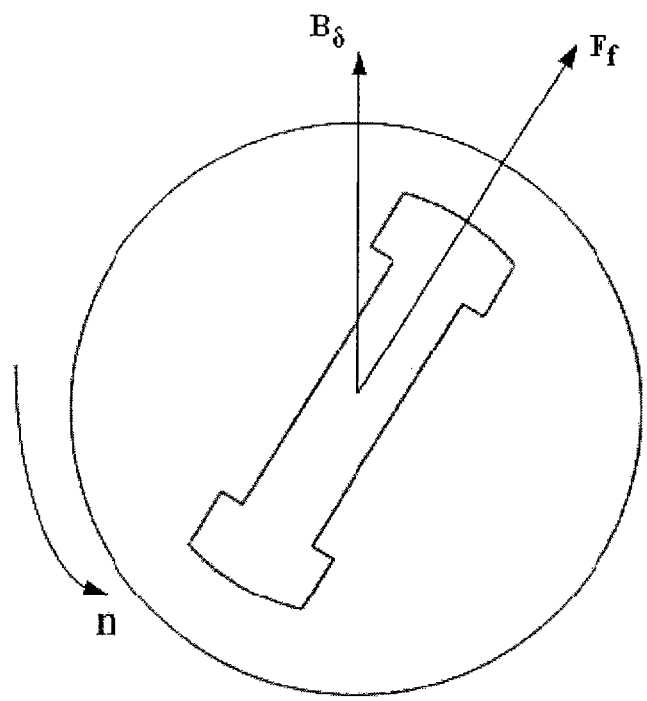
FIG. 2 illustrates the relationship of the rotating field and the rotor magnetic field of the motor under the electrical drive state.
Figure 3:
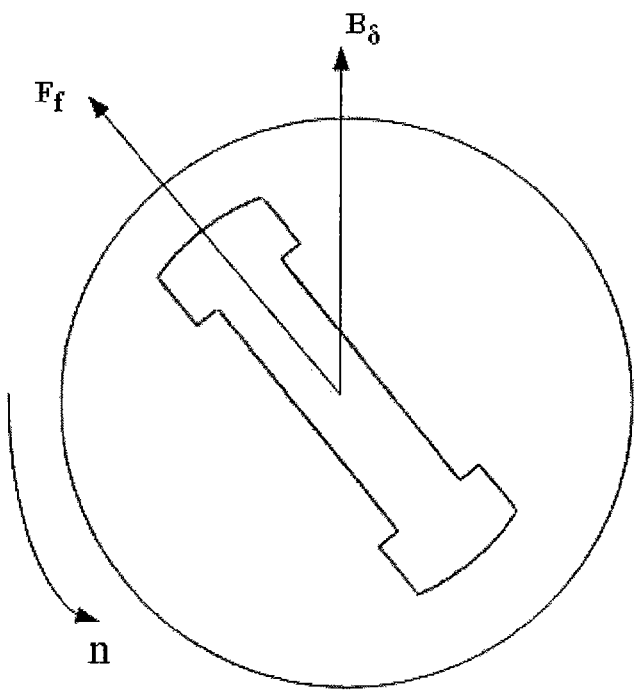
FIG. 3 illustrates the relationship of the rotating field and the rotor magnetic field of the motor under the energy feedback state.

Combined with FIG. 1, FIG. 2 and FIG. 3, two working states of motor are described as below, wherein both FIG. 2 and FIG. 3 are respectively shown the relationship of the rotating field and the rotor magnetic field of the motor under the electrical drive state and the energy feedback state. The working principle of the motor 9 under electrical drive state and the energy feedback state are as below: during the normal travel of the vehicle, the motor 9 is forward driving, and its rotor rotates counterclockwise, just then, seen from FIG. 1, a rotating field may be generated by applying the voltage from the battery 1 through inverter 7 on three windings (U, V, and W) of the motor 9, this magnetic field and the permanent magnetic field of rotor may be combined into a air-gap rotating field $B_\delta$ of the motor 9. FIG. 2 describes the directional relationship between the air-gap rotating field $B_\delta$ and the rotor magnetic field $F_f$ under the electrical drive state. Obviously, the direction of the field $B_\delta$ under the electrical drive state is ahead that of the field $F_f$, and the rotating field $B_\delta$ may drag the rotor magnetic field $F_f$ to rotate synchronously, that is, driving the rotor to rotate synchronously, thus converting the input electric power into the mechanical power. When there is a braking signal or a releasing the accelerator signal, the motor controller 6 requires to control the feedback energy of the motor 9, according to the operating principle of the motor, the directional relationship between two magnetic fields must be changed. FIG. 3 indicates the motor 9 under the generating state during the energy feedback, the direction of rotating field $B_\delta$ shall be lagged behind that of rotor magnetic field $F_f$, the rotor magnetic field $F_f$ may drive this rotating field $B_\delta$ to rotate synchronously to transfer the specified electromagnetic power, just then the mechanical energy of rotor shall be converted into the electric energy, and the electric energy outputted from the stator windings is transmitted to the battery 1 for charging, while during outputting the electric energy, the rotary speed of rotor is reduced, and thereby realized the braking purpose.

The motor controller 6 of the present invention is configured to obtain the accelerator-pedal travel value Gain, the brake-pedal travel value Brake_Deep and the current vehicle speed value V, and determine whether the brake-pedal travel value Brake_Deep is equal to 0%. The accelerator-pedal travel value Gain or the brake-pedal travel value Brake_Deep is a value between 0%~100%.

If the brake-pedal travel value Brake_Deep is not equal to 0%, that is to say the driver steps the brake pedal, then calculate a feedback torque T based on the current vehicle speed value V and the brake-pedal travel value Brake_Deep according to the equation as follows:

$$T = \begin{cases} 0, & \text{if } V < V_0 \\ K_1 V + K_2 \text{Brake\_Deep}, & \text{if } V_0 \le V < V_1, \\ K_1 V_1 + K_2 \text{Brake\_Deep}, & \text{if } V \ge V_1 \end{cases}$$

and control the motor 9 to output the feedback torque T. $K_1$ is a predetermined proportional coefficient of current vehicle speed, $K_2$ is a predetermined proportional coefficient of brake-pedal travel, $V_0$ is a predetermined minimum feedback vehicle speed, and $V_1$ is a predetermined maximum feedback vehicle speed.

Otherwise, if the brake-pedal travel value Brake_Deep is equal to 0%, that is to say the driver does not step the brake pedal, e.g. during downhill journey, then comparing the accelerator-pedal travel value Gain with a given feedback value, and if the accelerator-pedal travel value Gain is not greater than the given feedback value, then calculate the feedback torque T based on the current vehicle speed value V according to the equation as follows:

$$T = \begin{cases} 0, & \text{if } V < V_0 \\ KV, & \text{if } V_0 \leq V < V_1 \\ KV_1, & \text{if } V \geq V_1 \end{cases}$$

and control the motor 9 of the electric vehicle to output the feedback torque T. Wherein K is a predetermined proportional coefficient of current vehicle speed, others such as $V_0$ and $V_1$ are same as above mentioned. If the accelerator-pedal travel value Gain is greater than the given feedback value, then set the feedback torque T as 0.

The details processes executed by the motor controller 6 will be described referring to the method and FIG. 6 thereafter.

Figure 6:
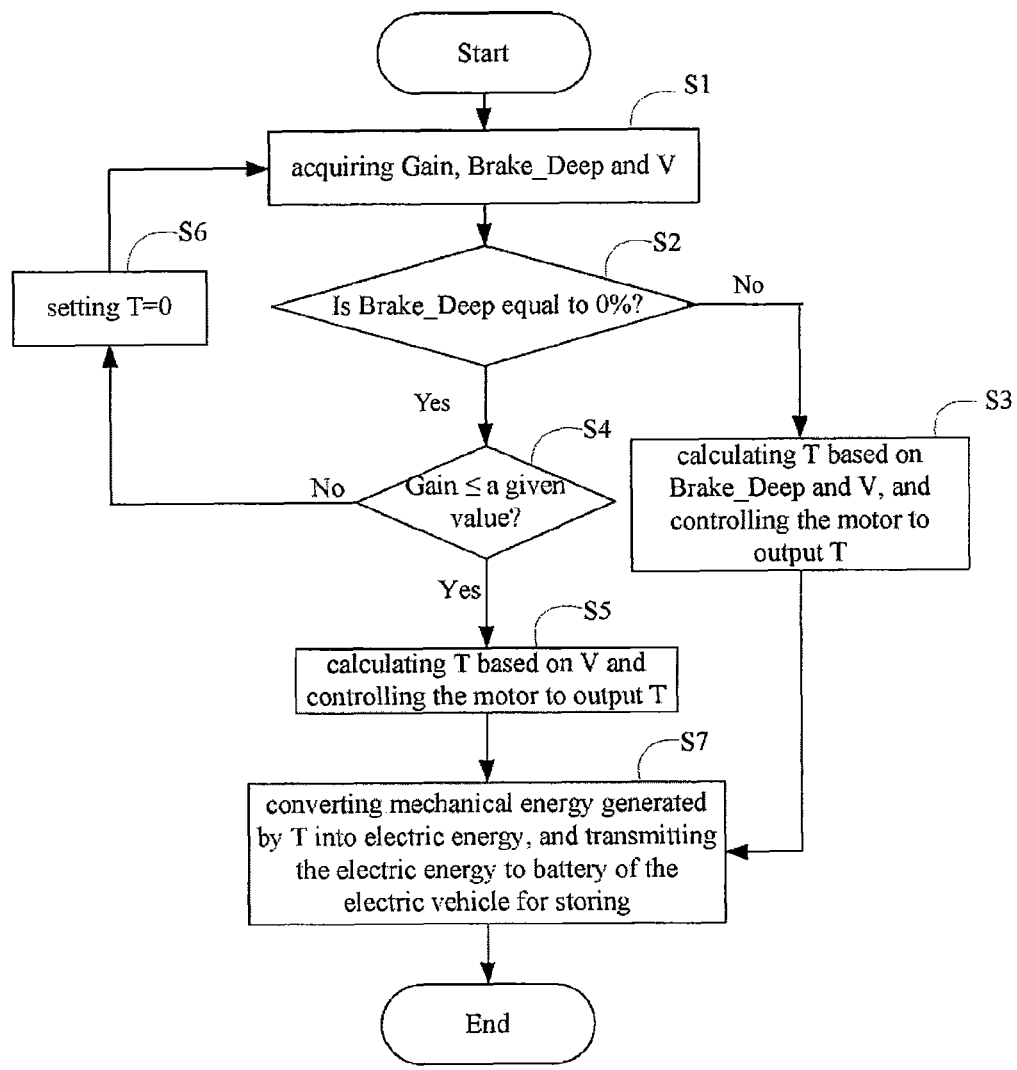
FIG. 6 is a flow chart of the method for controlling energy feedback executed by the motor controller according to the present invention.

Referred to FIG. 6, the present invention still provides a method for controlling energy feedback for an electric vehicle, comprising the following steps:

In step S1, acquiring an accelerator-pedal travel value Gain, a brake-pedal travel value Brake_Deep and a current vehicle speed value V. In step S2, determining whether the brake-pedal travel value Brake_Deep is equal to 0%, and going to step S3 if the brake-pedal travel value Brake_Deep is not equal to 0%, step 3 is corresponding to the energy feedback under braking condition, or going to step S4 if the brake-pedal travel value Brake_Deep is equal to 0%, and comparing the accelerator-pedal travel value Gain with a given feedback value in step S4, then going to step S5 if the accelerator-pedal travel value Gain is not greater than the given feedback value, the step S5 is corresponding to the energy feedback under non-braking condition. Otherwise, going to step S6 if the accelerator-pedal travel value Gain is greater than the given feedback value, and there is no energy feedback in step S6, that is to say setting the feedback torque T as 0. The above steps may be executed by the motor controller 6.

Figure 4:
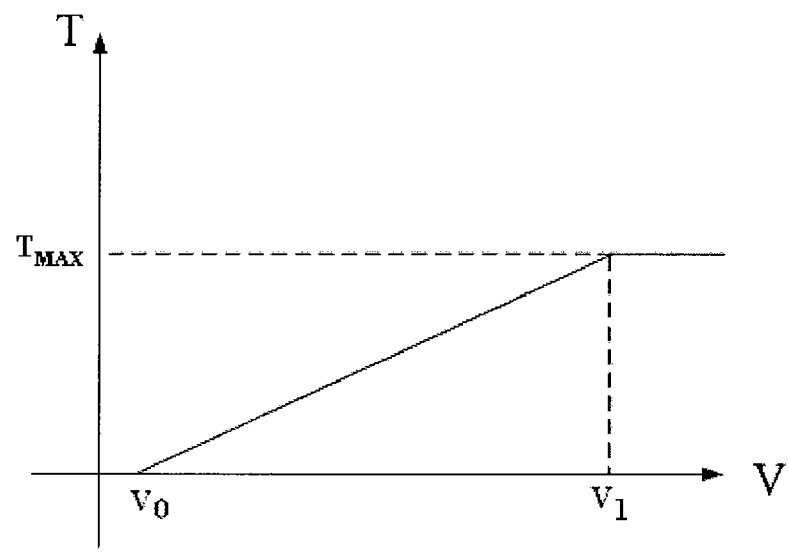
FIG. 4 is a function curve of feedback torques vs current vehicle speeds in the case of the brake-pedal travel value is equal to 0%.

Firstly, for the situation of step S5, the energy feedback under non-braking condition, for example during downhill journey, is described. A suitable reverse electromagnetic torque T must be selected according to the detected current vehicle speed value V, that is, the proportion of this torque in the whole deceleration torque is controlled. Under this proportion, it ensures that the invention has the basically identical deceleration effects with that of traditional fuel-fired vehicle, i.e., ensure its deceleration smoothness, no sudden deceleration problems occurs. FIG. 4 is a function curve of feedback torques vs current vehicle speeds in the case of the brake-pedal travel value is equal to 0%. Wherein the feedback torque T is varied with the vehicle speed under the specified range, its detailed function relationship is shown as the equation below:

$$T = \begin{cases} 0, & \text{if } V < V_0 \\ KV, & \text{if } V_0 \leq V < V_1 \\ KV_1, & \text{if } V \geq V_1 \end{cases}$$

Wherein, K is a predetermined proportional coefficient of the current vehicle speed, $V_0$ is a predetermined minimum feedback vehicle speed; and $V_1$ is a predetermined maximum feedback vehicle speed.

Figure 5:
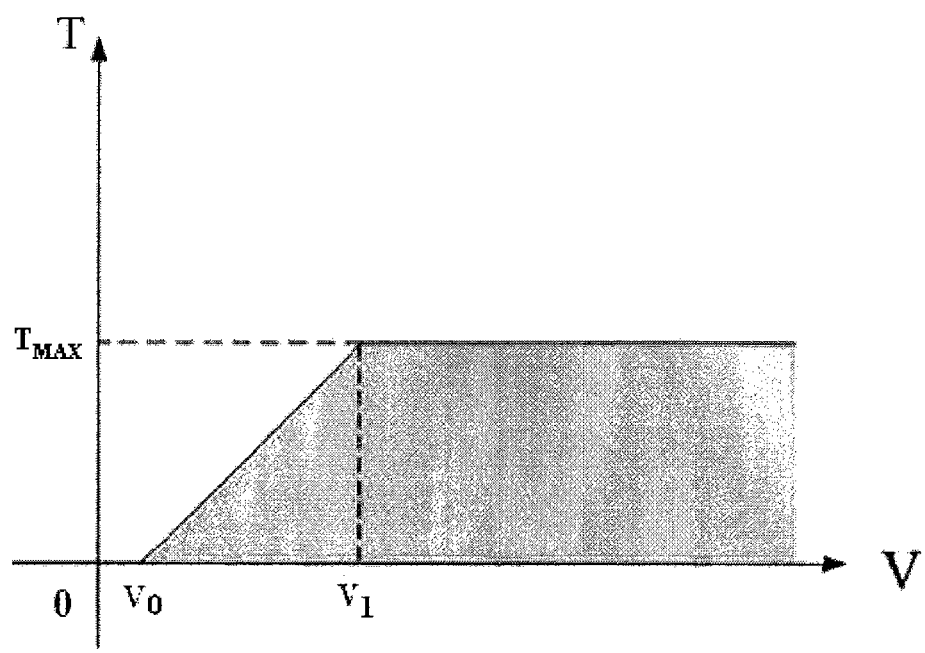
FIG. 5 is a function curve of feedback torques vs brake-pedal travel values and current vehicle speeds in the case of the brake-pedal travel value is not equal to 0%.

For the situation of step S3, the energy feedback under braking condition is described, During calculating the feedback torque, it shall not only consider the current vehicle speed V, but also consider the brake-pedal travel value Brake_Deep, i.e., under a same vehicle speed, the feedback torques are different from each other while the brake-pedal travels are different from each other; and under different vehicle speeds, the feedback torques are different from each other while the brake-pedal travel is a same value, in order to ensure it is similar to that of fuel-fired vehicle to ensure the braking purpose. FIG. 5 is a function curve of feedback torques vs brake-pedal travel values and current vehicle speeds in the case of the brake-pedal travel value is not equal to 0%, for different brake-pedal travels and vehicle speeds, the feedback torque is the gray zone. The oblique line part is the feedback torque under different speeds with the brake-pedal travel is 100%, for the same speed, the brake-pedal travel along axis-T is increased, that is, the feedback torque is increased if the brake-pedal travel is increasing, after the vehicle speed reaches $V_1$, the feedback torque is constant at the same brake-pedal travel, and its maximum feedback torque $T_{MAX}$ is also constant, that is, just then the speed value V for calculating is a constant, i.e., $V_1$, its detailed function relationship is as the equation below:

$$T = \begin{cases} 0, & \text{if } V < V_0 \\ K_1 V + K_2 \text{Brake\_Deep}, & \text{if } V_0 \leq V < V_1 \\ K_1 V_1 + K_2 \text{Brake\_Deep}, & \text{if } V \geq V_1 \end{cases}$$

Wherein, $K_1$ is a predetermined proportional coefficient of current vehicle speed, $K_2$ is a predetermined proportional coefficient of brake-pedal travel, $V_0$ is a predetermined minimum feedback vehicle speed, and $V_1$ is a predetermined maximum feedback vehicle speed.

The common point of the energy feedback of both situations mentioned above is that they both have a maximum reverse brake torque $T_{MAX}$, that is, they have a maximum feedback proportion. Moreover, for both cases of energy feedback mentioned above, their common point is when the current vehicle speed less than the given minimum feedback vehicle speed $V_0$, no energy feedback, that is, the feedback torque is set to 0.

The reasonable configuration of all parameters mentioned above may determine the effect of energy feedback. In order to not cause the frequent energy feedback and unstable rotary speed of motor, or the low efficiency of energy feedback, the range of the given feedback value compared with the accelerator-pedal travel value may be preferred as 4%~6%.

Moreover, when the vehicle speed is very low, if energy feedback is still executed, the energy fed is very tiny and just then regenerative brake has became useless. Further, at the moment of the vehicle speed is zero, if the motor is still under the energy feedback state, the rotary speed of motor rotor shall be varied around zero, and the given $V_0$ may solve this problem properly. However, if $V_0$ is too high, the feedback efficiency shall be influenced. Thus, the purpose of limitation to $V_1$ is to solve the dithering of the motor 9 around $V_0$ during downhill journey. The reason for this phenomenon is during downhill journey, if the accelerator pedal is not stepped, the energy feedback brake may cause the current vehicle speed gradually lower to $V_0$, and when the vehicle speed is lower than $V_0$, no energy is fed back, then the vehicle shall accelerate beyond $V_0$ due to its gravity. However, when beyond $V_0$, the feedback brake shall let the vehicle speed below $V_0$ again, thus the rotary speed of motor shall fluctuate, and cause the motor dithering. If the value of $V_1$ approaches to that of $V_0$, more feedback energy is obtained, and the energy efficiency is improved, however, considering the feeling of passengers, the motor must be operated stably, thus $V_1$ is set to form a buffer zone to inhibit the motor dithering around $V_0$ due to the energy feedback state. Moreover, $V_0$ and $V_1$ are determined according to technical parameters of vehicle, if the vehicle weight is different, the values of $V_0$ and V1 may be also different. It is preferred that the range of the minimum feedback vehicle speed $V_0$ is 3~10 Km/h, and the range of the maximum feedback vehicle speed $V_1$ is 15~25 Km/h.

For the maximum feedback torque $T_{MAX}$, in the case of Brake_Deep is equal to 0%, the limitation to $T_{MAX}$ (i.e. $KV_1$) shall mainly allow for the ride comfort, and in the case of Brake_Deep is not equal to 0%, the limitation to $T_{MAX}$ (i.e. $K_1V_1+K_2$Brake_Deep) shall mainly allow for the impact of feedback current, that is to say, if $T_{MAX}$ is too high may cause the impact of feedback current greater, and also for the conditions that will not cause the over-current protection of power device IPM.

When determining the values of $K_1$, $K_2$ or K mentioned above, firstly determining the maximum feedback torque $T_{MAX}$ and the maximum feedback vehicle speed $V_1$, and then preliminarily determining its value according to the total mass of vehicle, the rated power of the motor and the tolerable maximum current of power device in inverter. The ranges of $K_1$, $K_2$ and K are all 0~1, considering the brake-pedal travel may apply great influences to the feedback torque, so in general $K_1<K_2$. Moreover, the higher the tolerable maximum current of power device in inverter is, the greater the value of $K_2$ may be. For different vehicle types, $K_1$, $K_2$ and K are basically increased with the increasing of the total mass of vehicle and the rated power of the motor, and K is determined similar with $K_1$. After obtaining the preliminary values, then the test workers may implement the site test for the actual vehicle, check the running of vehicle under the preliminary $K_1$, $K_2$ and K through a vehicle diagnosis tester, combined with the passengers' comfort to determine whether the values are proper or not, and adjust the values if necessary. When $K_1$ and $K_2$ must be determined, in general, firstly $K_2$ associated with brake-pedal travel is determined, and then $K_1$ is adjusted to meet the equation requirements. For different vehicles, parameters are different when equipped different power motors or different power devices, for example, a vehicle with total mass about 1.5 t and equipped a motor with rated power 60 KW and power devices with the tolerable maximum current 1200 A, then $K_1$ is set to 0.2, K2 is set to 0.6, and K is set to 0.1. Alternatively, if the tolerable maximum current is increased to 1600 A, then $K_2$ may be slightly increased, for example, to 0.8. Moreover, for a vehicle with total mass about 1.8 t and equipped with a motor of rated power 60 KW and the power devices with the tolerable maximum current 1200 A, accordingly, $K_1$ is 0.4, $K_2$ is 0.7, and K is 0.3.

For all calculations mentioned above, all values for equations must adopt the nominal values, however, in this description, all adopt the actual values.

If the feedback torque is generated in above steps, then in step S7, converting mechanical energy generated by the feedback torque T in step S3 or S5 into electric energy, and transmitting the electric energy to battery of the electric vehicle for storing. Thus the endurance mileage of electric vehicle may be effectively prolonged, and the battery energy efficiency is improved.

This embodiment for the present invention is only for reference, the relevant technicians may further develop it in other modes; all belong to the protection range of the present invention.

We claim:

1. An apparatus for controlling energy feedback for an electric vehicle having an electric motor and a storage battery, comprising:
   a motor controller;
   an accelerator-pedal position sensor configured to sense a position of an accelerator-pedal, and transmit an accelerator-pedal position signal to the motor controller;
   a brake-pedal position sensor configured to sense a sensing position of a brake-pedal of the vehicle, and transmit a brake-pedal position signal to the motor controller;
   a vehicle speed sensor configured to sense a current speed of the vehicle, and transmit a current vehicle speed signal to the motor controller;
   the motor controller, configured to:
      obtain an accelerator-pedal travel value (Gain), a brake-pedal travel value (Brake_Deep), and a current vehicle speed value (V) based on the accelerator-pedal position signal, the brake-pedal position signal, and the current vehicle speed signal,
      if the brake-pedal travel value (Brake_Deep) is not equal to 0%, calculate a feedback torque (T) based on the current vehicle speed value (V) and the brake-pedal travel value (Brake_Deep), and control an output of the motor based on the calculated feedback torque (T);
      if the brake-pedal travel value (Brake_Deep) is equal to 0% and if the accelerator-pedal travel value (Gain) is less than or equal to a given feedback value, then calculate the feedback torque (T) based on the current vehicle speed value (V), and control an output of the motor based on the calculated feedback torque (T); and
      if the brake-pedal travel value (Brake_Deep) is equal to 0% and if the accelerator-pedal travel value (Gain) is not less than or equal to the given feedback value, then set the feedback torque (T) equal to 0; and
   an inverter connected between the motor and the battery configured to convert mechanical energy generated by the feedback torque (T) into electric energy, and charge the storage battery.

2. The apparatus of claim 1, wherein the motor controller is further configured to:
   if the brake-pedal travel value (Brake_Deep) is not equal to 0%, calculate the feedback torque (T) according to the following equation:

$$T = \begin{cases} 0, & \text{if } V < V_0, \\ K_1V + K_2\text{Brake\_Deep}, & \text{if } V_0 \leq V < V_1, \\ K_1V_1 + K_2\text{Brake\_Deep}, & \text{if } V \geq V_1 \end{cases}$$

if the brake-pedal travel (Brake_Deep) is equal to 0% and the accelerator-pedal travel value (Gain) is not greater than the given feedback value, calculate the feedback torque (T) according to the following equation:

$$T = \begin{cases} 0, & \text{if } V < V_0, \\ KV, & \text{if } V_0 \leq V < V_1, \\ KV_1, & \text{if } V \geq V_1 \end{cases}$$

wherein K and $K_1$ are respectively predetermined proportional coefficients of current vehicle speed, $K_2$ is a predetermined proportional coefficient of brake-pedal travel, $V_0$ is a predetermined minimum feedback vehicle speed, and $V_1$ is a predetermined maximum feedback vehicle speed.

3. The apparatus of claim 2, wherein the predetermined minimum feedback vehicle speed ($V_0$) range between 3 km/h and 10 km/h, and the predetermined maximum feedback vehicle speed ($V_1$) ranges between 15 km/h and 25 km/h.

4. The apparatus of claim 2, wherein the values of $K_1$, $K_2$ and K are determined based on a total mass of the vehicle, a rated power of the motor, and a tolerable maximum current of power devices.

5. The apparatus of claim 1, wherein the given feedback value ranges between 4% and 6%.

6. A method for controlling energy feedback for an electric vehicle having an electric motor and a storage battery, comprising the steps of:

S1) determining an accelerator-pedal travel value (Gain), and a brake-pedal travel value (Brake_Deep);

S2) determining a current vehicle speed value (V);

S3) if the brake-pedal travel value (Brake_Deep) is not equal to 0%, calculating a feedback torque (T) based on the current vehicle speed value (V) and the brake-pedal travel value (Brake_Deep), controlling an output of the motor according to the feedback torque (T), and converting mechanical energy generated by the feedback torque (T) into electric energy to charge the storage battery;

S4) if the brake-pedal travel value (Brake_Deep) is equal to 0% and if the accelerator-pedal travel value (Gain) is less than or equal to a given feedback value, then calculating the feedback torque (T) based on the current vehicle speed value (V), controlling the output of the motor based on the feedback torque (T), and converting mechanical energy generated by the feedback torque (T) into electric energy to charge the storage battery; and S5) if the brake-pedal travel value (Brake_Deep) is equal to 0% and if the accelerator-pedal travel value (Gain) is not less than or equal to a given feedback value, then setting the feedback torque (T) equal to 0.

7. The method of claim 6, wherein the feedback torque (T) in step S3 is calculated according to the equation:

$$T = \begin{cases} 0, & \text{if } V < V_0, \\ K_1 V + K_2 \text{Brake\_Deep}, & \text{if } V_0 \leq V < V_1, \\ K_1 V_1 + K_2 \text{Brake\_Deep}, & \text{if } V \geq V_1 \end{cases}$$

and the feedback torque (T) in step S4 is calculated according to the equation:

$$T = \begin{cases} 0, & \text{if } V < V_0, \\ KV, & \text{if } V_0 \leq V < V_1, \\ KV_1, & \text{if } V \geq V_1 \end{cases}$$

wherein, K and $K_1$ are respectively predetermined proportional coefficients of current vehicle speed, $K_2$ is a predetermined proportional coefficient of brake-pedal travel, $V_0$ is a predetermined minimum feedback vehicle speed, and $V_1$ is a predetermined maximum feedback vehicle speed.

8. The method of claim 7, wherein the predetermined minimum feedback vehicle speed ($V_0$) ranges between 3 km/hr and 10 km/h, and the predetermined maximum feedback vehicle speed ($V_1$) ranges between 15 km/hr and 25 km/h.

9. The method of claim 7, wherein the values of $K_1$, $K_2$ and K are determined based on a total mass of the vehicle, the rated power of the motor, and a tolerable maximum current of power devices.

10. The method of claim 6, wherein the given feedback value ranges between 4% and 6%.

11. A computer readable memory or data storage means encoded with data representing a computer program for system for controlling output torque of an electric motor for an electric vehicle, the computer readable memory or data storage means causing a computer to perform the acts of:

S1) determining an accelerator-pedal travel value (Gain), and a brake-pedal travel value (Brake_Deep);

S2) determining a current vehicle speed value (V);

S3) if the brake-pedal travel value (Brake_Deep) is not equal to 0%, calculating a feedback torque (T) based on the current vehicle speed value (V) and the brake-pedal travel value (Brake_Deep), controlling an output of the motor according to the feedback torque (T), and converting mechanical energy generated by the feedback torque (T) into electric energy to charge a storage battery;

S4) if the brake-pedal travel value (Brake_Deep) is equal to 0% and if the accelerator-pedal travel value (Gain) is less than or equal to a given feedback value, then calculating the feedback torque (T) based on the current vehicle speed value (V), controlling the output of the motor based on the feedback torque (T), and converting mechanical energy generated by the feedback torque (T) into electric energy to charge the storage battery; and S5) if the brake-pedal travel value (Brake_Deep) is equal to 0% and if the accelerator-pedal travel value (Gain) is not less than or equal to a given feedback value, then setting the feedback torque (T) equal to 0.

\* \* \* \* \*